C. F. A. HINRICHS.

Lamps.

No. 5,708. Reissued Dec. 30, 1873.

Witnesses,
Chas. H. Smith
Harold Serrell

Charles F. A. Hinrichs
per Lemuel W. Serrell
assignee

AM. PHOTO-LITHOGRAPHIC Co. N.Y. (OSBORNE'S PROCESS)

UNITED STATES PATENT OFFICE.

CHARLES F. A. HINRICHS, OF BROOKLYN, N. Y., ASSIGNEE OF KATHARINA KLEEMANN, EXECUTRIX OF CARL A. KLEEMANN, DECEASED.

IMPROVEMENT IN LAMPS.

Specification forming part of Letters Patent No. 37,867, dated March 10, 1863; reissue No. 3,068, dated August 4, 1868; reissue No. 3,900, dated March 29, 1870; reissue No. 5,708, dated December 30, 1873; application filed December 10, 1873.

*To all whom it may concern:*

Be it known that CARL A. KLEEMANN, late of Erfurt, in the Kingdom of Prussia, now deceased, invented an Improvement in Lamps, of which the following is a specification:

Before this invention a lamp had been made with an argand-wick, air-openings, and a contracted neck in the chimney, and a button to spread the flame. In lamps where the button was dispensed with and a contracted neck employed in the chimney, the regulation of the air was effected either by a metal deflector above the wick, that confined part of the light, or else solely by the chimney, in which latter case it was liable to smoke when exposed to slight currents of air; the variations in the size of the chimney also interfered with perfect combustion.

In the present invention the regulation of the air-currents is effected by the metallic parts of the burner; there is not any metallic deflector or button above the base of the flame to obstruct or deflect the light, and the combustion is not rendered imperfect in consequence of the slight inaccuracies of the glass chimney.

Figure 1:
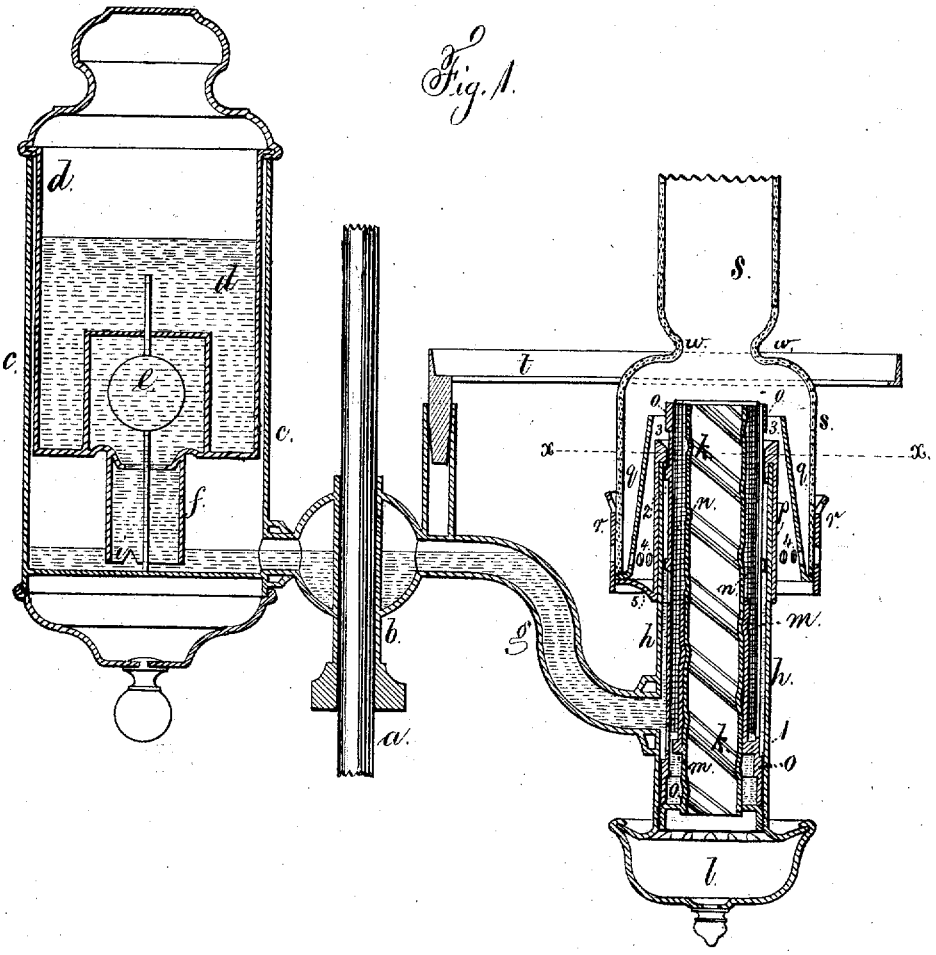
Figure 2:
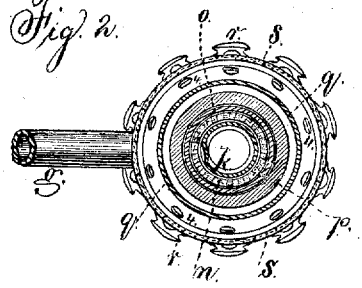

In the drawing, Figure 1 is a vertical section of this improved lamp, and Fig. 2 is a sectional plan of part of the burner at the line *x x*.

The standard *a* is upon any suitable base, and the tube *b*, sliding upon the same, is provided with a clamp-screw; but any suitable means may be used for sustaining the lamp. The reservoir *c*, fountain *d*, valve *e*, cylinder *f*, notch *i*, and tube *g*, leading to the lamp-burner, are represented in the drawing, but as they are well known they do not require further description; and the shade-ring *t* may be used as before employed. The lamp-burner is made for an argand-wick, *n*, around the air-tube *k*, and this air-tube *k* is shown of thin sheet metal, in which is bent up a screw for the follower *m*, that is used for raising and lowering the wick. This air-tube *k* is connected, at the bottom, to the outer cylinder *h*, and at this point the drip-cup *l* is represented as screwed on. These parts also are similar to devices known before this invention. The slotted cylinder *o*, between the wick *n* and cylinder *h*, is represented as the device for moving the wick-raiser *m*, such wick holder and raiser *m* having a projection, 1, entering the slot in the cylinder *o*, and the cylinder *p* of the burner having a notched downward projection within the cylinder *h*, taking a projection, 2, on the cylinder *o*. These devices are convenient in the form of lamp shown for raising and lowering the wick, and a cup-shaped receptacle, at 3, is also shown for returning any overflow of oil into the lamp. The chimney *s* is made with a contracted neck, *w*, sufficiently upon the upper end of the wick-tube to contract the flame and direct the internal and external currents of air into the flame. This chimney is sustained in the holder *r*, which is here represented as a circular range of springs.

In order to obtain the most perfect combustion, it is necessary to regulate the admission of atmospheric air between the argand-wick and the chimney, or else the flame will be irregular or very sensitive to external currents of air, (as in the argand and astral lamps heretofore in use.) To effect this object the metal parts of the lamp-burner, between the wick and the chimney-holder, are provided with the necessary openings for admitting the proper quantity of atmospheric air.

The supports 5, extending from the chimney-holder to the burner, support the former, and the cone *q*, extending upwardly from the base of the chimney to near the base of the flame, admits, at its upper end, a portion of the regulated supply of air passing to the flame, and the openings 4 admit the balance of the regulated supply that passes up between the cone and chimney to the flame. The contracted neck of the chimney directs the air upon the outside of the flame.

This lamp-burner, being made of thin sheet metal and largely exposed to the action of the air, does not become heated to any considerable extent, and the flame is much more uniform than in lamps heretofore made that do not combine the elements or instrumentalities herein set forth.

What is claimed as the invention of said CARL A. KLEEMANN is—

1. An argand lamp-burner in which the following instrumentalities are combined: An argand-wick, a central air-tube, a chimney-holder, a draft-regulator to determine the quantity of air passing up outside the flame, and a chimney with a contracted neck sufficiently above the wick to direct the air upon the flame independent of any metallic deflector, substantially as set forth.

2. The argand-burner, made with a spring chimney-holder below the upper end of the wick-tube and around the base of the cone, for receiving the cylindrical base of the glass chimney, the said cone being provided with openings through the same, substantially as and for the purposes set forth.

Signed by me this 3d day of December, A. D. 1873.

C. F. A. HINRICHS.

Witnesses:
GEO. T. PINCKNEY,
GEORGE SERRELL.